United States Patent [19]

Kataoka et al.

[11] Patent Number: 5,565,854
[45] Date of Patent: Oct. 15, 1996

[54] MMC UNIT

[75] Inventors: Minoru Kataoka; Yutaka Sakai, both of Minamitsuru-gun, Japan

[73] Assignee: Fanuc Ltd., Yamanashi, Japan

[21] Appl. No.: 356,226

[22] PCT Filed: Apr. 21, 1994

[86] PCT No.: PCT/JP94/00667

§ 371 Date: Dec. 19, 1994

§ 102(e) Date: Dec. 19, 1994

[87] PCT Pub. No.: WO94/27197

PCT Pub. Date: Nov. 24, 1994

[30] Foreign Application Priority Data

May 7, 1993 [JP] Japan .................................. 5-106564

[51] Int. Cl.⁶ ................................................ G05B 23/02
[52] U.S. Cl. .................... 340/825.06; 345/904; 345/156
[58] Field of Search .................................. 345/205, 206, 345/3, 173, 904, 156, 168; 340/825.06, 825.44; 348/522

[56] References Cited

U.S. PATENT DOCUMENTS 5,177,328  1/1993  Ito et al. ................................. 345/173
5,249,164  9/1993  Koz ........................................ 348/522
5,361,061  11/1994 Mays et al. ........................ 340/825.44
5,451,933  9/1995  Stricklin et al. .................... 340/825.06

FOREIGN PATENT DOCUMENTS

62-99812   5/1987  Japan .
3-229308  10/1991  Japan .
4-57104    2/1992  Japan .

Primary Examiner—Raymond J. Bayerl
Assistant Examiner—Matthew Luu
Attorney, Agent, or Firm—Staas & Halsey

[57] ABSTRACT

A man machine controller (MMC) unit is connected to a computer numerical control apparatus and controls a servo-amplifier or a machine such as a machine tool, a robot, or a plastic mold injection machine. The MMC permits easy upgrading, changing, and the like of display functions. The MMC includes a control circuit board for controlling the MMC unit in accordance with a command supplied from the computer numerical control apparatus. The control circuit board is equipped with a socket to which a personal computer function card is detachably connected. The personal computer function card has a processor which controls images to be displayed on a display such as an LCD. The MMC also inputs data for processing by a main processor. The main processor controls the servoamplifier or the machine in response to the input data.

17 Claims, 6 Drawing Sheets

MMC UNIT

This application is a 371 of PCT/JP94/00667 filed Apr. 21, 1994.

TECHNICAL FIELD

This invention relates to a man machine controller (MMC) unit for controlling a man-machine communication, and more particularly to an MMC unit to be connected to a computer numerical control apparatus, robot control apparatus, and the like.

BACKGROUND ART

In order to control a computer numerical control apparatus, robot control apparatus and the like, a man machine controller (MMC) unit becomes necessary for controlling a man-machine communication. For example, an MMC unit connected to a computer numerical control apparatus is allowed to implement an animated simulation operation, interactive program input operation, etc.

A control apparatus or an MMC unit, available for displaying images during such operations, is heretofore provided with display control means therein. The display control means has a processor by itself, wherein an image control signal from a processor of the control apparatus is converted to an image signal, and a resultant image is displayed on a display unit such as a cathode ray tube (CRT), a liquid crystal display (LCD), and the like. The control apparatus also contains transfer control means for transferring input data through operator keys.

When the display control means and the transfer control means are built into a control apparatus, however, the board on which the display control circuit is mounted must be replaced in its entirety when upgrading and changing of the display functions and operational functions are required, whereby cost efficiency and working efficiency are lowered.

DISCLOSURE OF THE INVENTION

In view of the above problem, it is an object of the present invention to provide an MMC unit wherein the display functions and operational functions are allowed to be easily upgraded, changed, and so on.

To achieve the above object, there is provided in accordance with the present invention an MMC unit for controlling a man-machine communication, comprising a display unit, data input means, a personal computer function card which contains a processor, display control means for controlling a screen display on the display unit in accordance with display data and display command signals from a main control apparatus, and data transfer means for transferring the input data supplied from the data input means and the data processed by the processor to the main control apparatus, and a socket to which the personal computer function card is detachably connected.

Images can be displayed on the display unit by connecting both the display unit for displaying images and the data input means, via respective connectors, to the personal computer function card which contains a processor, display control means for controlling a screen display on the display unit in accordance with display command signals from a main control apparatus, and data transfer means. As the personal computer function card is detachably connected to the socket, the personal computer function card can be replaced as required.

BEST MODE FOR CARRYING OUT THE INVENTION

Several preferred embodiments of the present invention will be described below with reference to the drawings.

Figure 2:
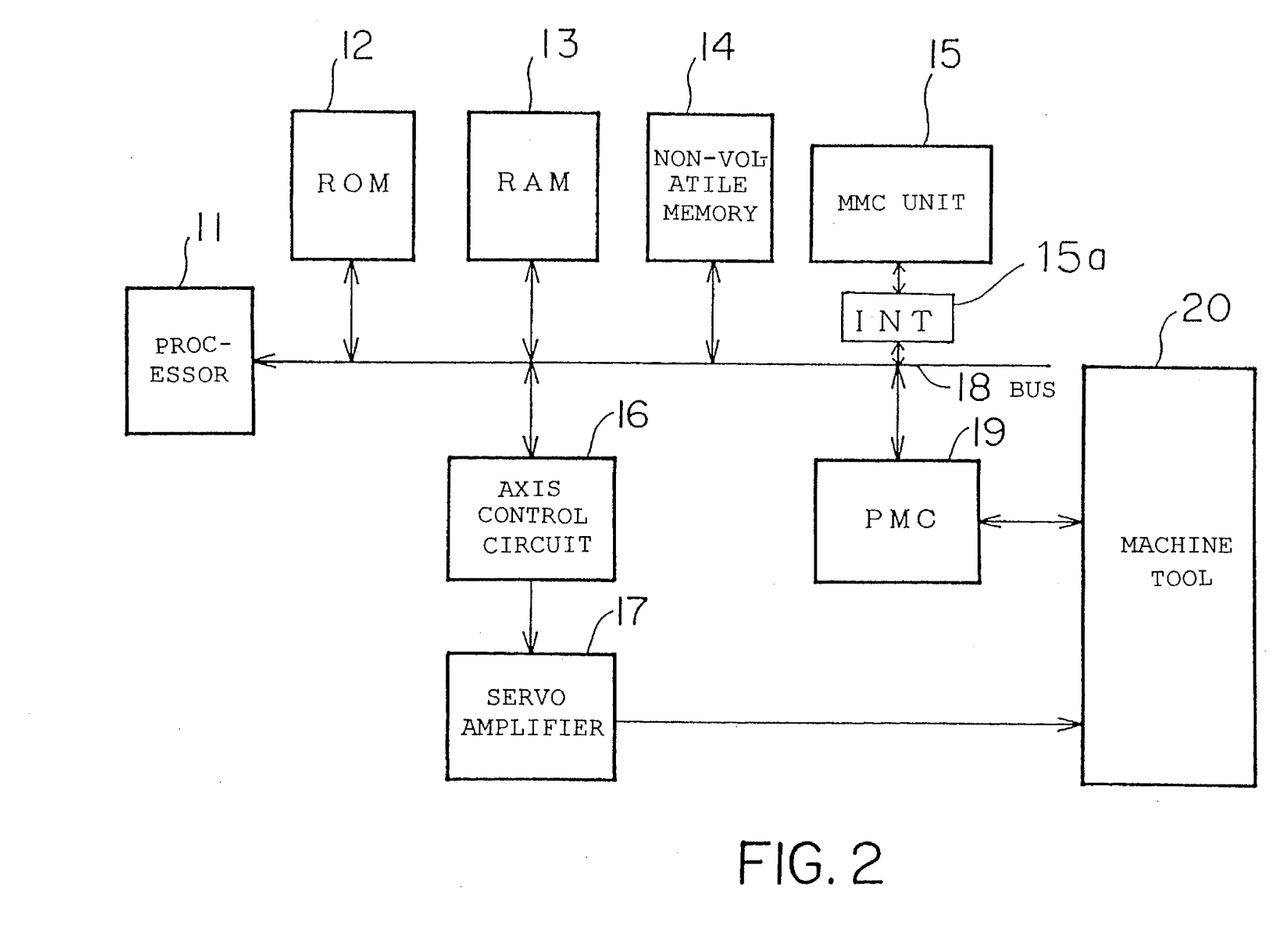
FIG. 2 is a block diagram illustrating a hardware configuration of an interactive computer numerical control apparatus (CNC) to which an inventive MMC is connected.

FIG. 2 is a block diagram illustrating a hardware configuration of an interactive computer numerical control apparatus (CNC) to which a man machine controller (MMC) unit of the present invention is connected. A processor 11 controls the overall CNC in accordance with a system program stored in a ROM 12 which comprises an EPROM, an EEPROM, or the like. A RAM 13 comprises an SRAM or the like, in which various data and input/output signals are stored. A non-volatile memory 14 comprises a CMOS or the like which is backed up with a battery, wherein a parameter, pitch error compensation data, tool offset amount data and the like desired to be retained after turning off the power are stored.

The MMC unit 15 connected to a bus 18 via an interface (INT) 15a displays a profile, a machining condition, a generated machining program and the like on a liquid crystal display (LCD) 153a (which will be described hereinafter) when generating a machining program on an interactive basis. Also, the MMC unit 15 is allowed to generate a machining program as an operator inputs data in accordance with indications displayed on the LCD 153a.

In response to a signal such as an M function signal or the like via the bus 18, a programmable machine controller (PMC) 19 handles the received signal using a sequence program and yields an output signal to control a machine tool 20. In response to an input signal from the machine tool 20, the PMC 19 also handles the input signal using the sequence program and transfers a necessary input signal to the processor 11 via the bus 18.

An axis control circuit 16 supplies a command on an axis to a servo amplifier 17 in response to an axis move command from the processor 11. In response to this move command, the servo amplifier drives a servo motor mounted on the machine tool 20.

Then the configuration of the MMC unit 15 will be concretely described.

Figure 1:
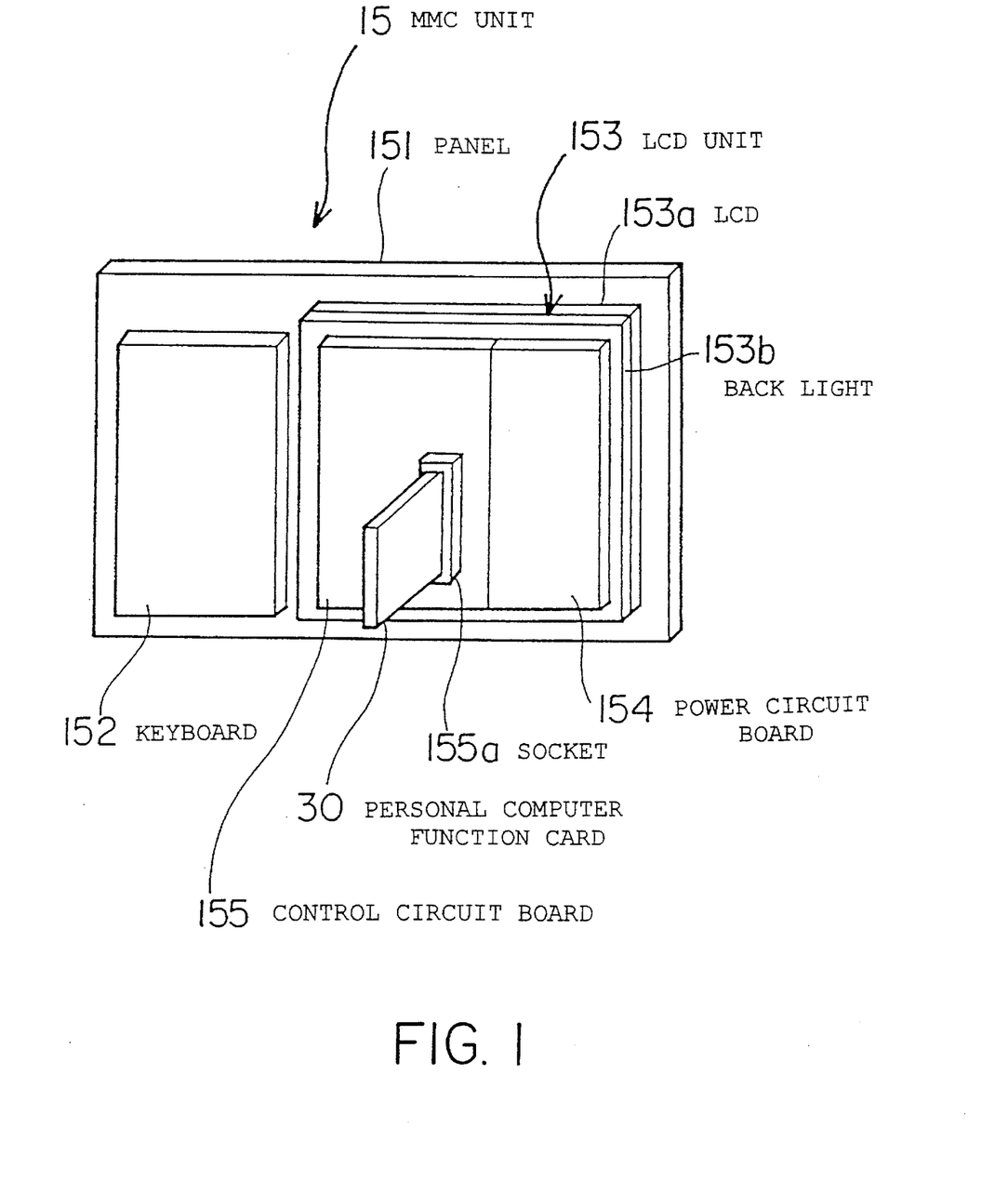
FIG. 1 is a schematic rear view of an inventive MMC unit.

FIG. 1 is a schematic rear view of the MMC unit 15 with a cover removed to show an interior construction. A keyboard 152 and an LCD unit 153 are mounted on a panel 151. The LCD unit 153 comprises an LCD 153a in the front and a back light 153b in the rear. Behind the back light 153b, a power circuit board 154 and a control circuit board 155 are mounted. The power circuit board 154 converts an external AC supply voltage to a predetermined DC voltage to be delivered to the LCD unit 153 and the control circuit board 155.

The control circuit board 155 has a function for controlling the entire MMC unit 15 in accordance with the commands and the like from the CNC. A socket 155a to which a personal computer function card 30 is detachably connected is mounted on this control circuit board 155. The personal computer function card 30 has a processor and implements the processing including the control of the images to be displayed on the LCD 153a and the like of the MMC unit 15 as described later.

Figure 3:
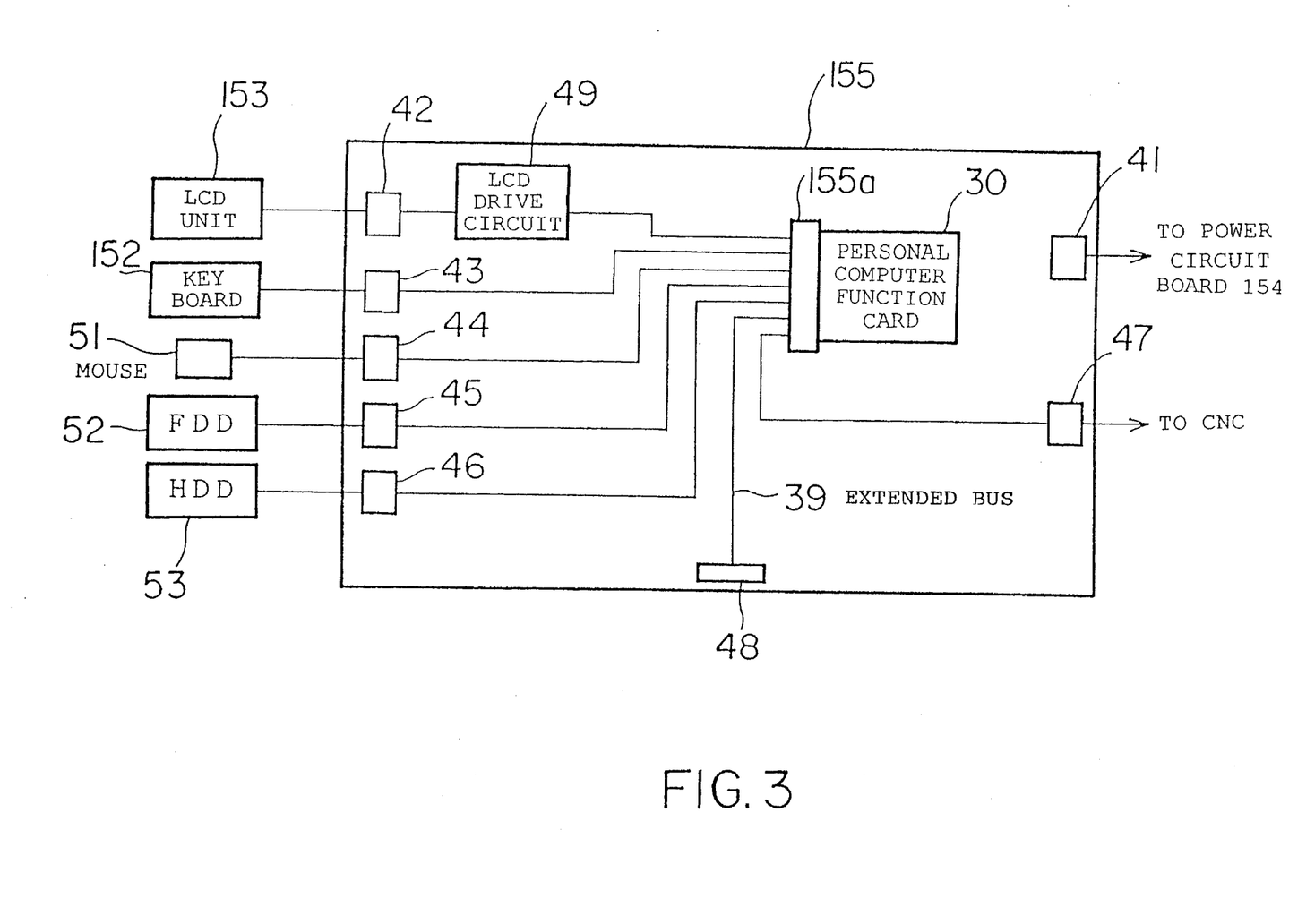
FIG. 3 is a block diagram illustrating a main configuration of a control circuit board.

FIG. 3 is a block diagram illustrating a main configuration of the control circuit board 155. The control circuit board 155 operates on the supply voltage supplied from the power circuit board 154 via a connector 41. Respective pins in the socket 155a, into which the personal computer function card 30 is inserted, are connected to connectors 43 to 47, an LCD drive circuit 49, and an extended bus 39 corresponding to a signal type to be transferred.

The LCD drive circuit 49 connected to the LCD unit 153 via a connector 42 drives the LCD 153a and the back light 153b in accordance with an image signal from the personal computer function card 30 so as to display images as commanded by the signal.

A key input signal from the keyboard 152 is sent to the personal computer function card 30 via the connector 43. Also data and the like may be inputted using a mouse 51 connected to the connector 44.

The connectors 45 and 46 are respectively connected to a floppy disk drive (FDD) 52 and a hard disk drive (HDD) 53, so that the upgrading or the like of software of the personal computer function card 30 is carried out by reading an upgrading program stored in the FDD or the HDD. In addition, data and programs desired to be retained may be stored in the FDD or the HDD.

The extended bus 39 may be connected to an external device via the connector 48 to obtain a higher data transfer rate.

The personal computer function card 30 is also connected to the CNC body via the connector 47 using a communication line, whereby the card 30 can receive a display command from the CNC and return key input data or the like thereto. Furthermore, signal transfer at a higher rate is obtained by disposing a serial interface circuit between the extended bus 39 and the connector 47.

Figure 4:
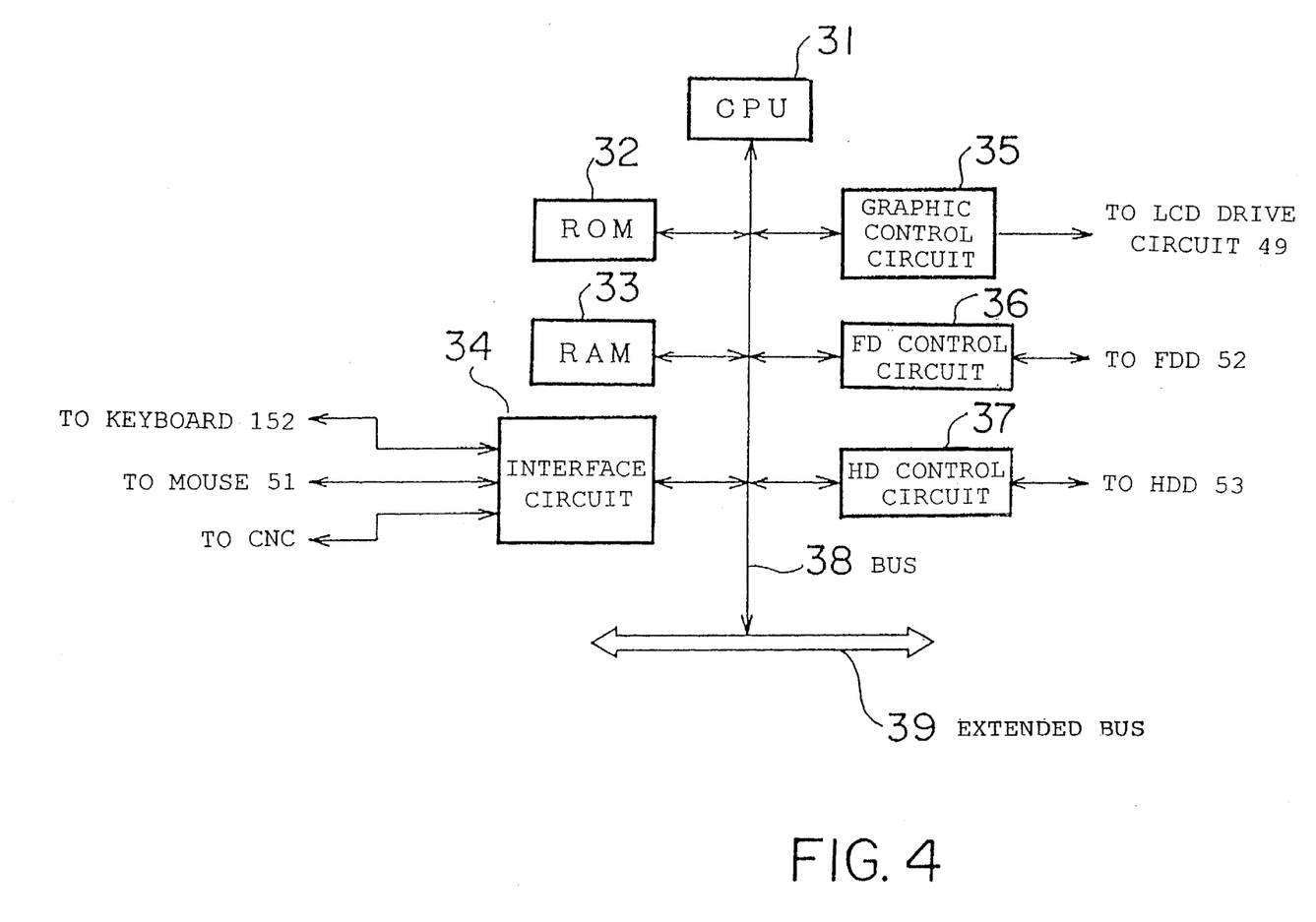
FIG. 4 is a block diagram illustrating a hardware configuration within a personal computer function card.

FIG. 4 is a block diagram illustrating a hardware configuration within the personal computer function card. A ROM 32, a RAM 33, an interface circuit 34, a graphic control circuit 35, a floppy disk (FD) control circuit 36, a hard disc (HD) control circuit 37 and the extended bus 39 are connected to a processor 31 via the bus 38.

The processor 31 controls the overall personal computer function card 30 in accordance with the system program stored in the ROM 32. The ROM 32, for example, comprises a flash ROM, and the contents stored therein are allowed to be rewritten. To run a graphic program stored in the ROM 32, this program is first written into the RAM 33, then executed. Also, the processor 31 may be operated in accordance with an instruction on the ROM 32. The RAM 33 further contains data necessary during operations.

The keyboard 152, the mouse 51 and the CNC are connected to the interface circuit 34 which receives an input signal from the keyboard 152 and the mouse 51 and a display command signal and the like from the CNC, then converts the received signal to an adequate signal for handling with the processor 31, and supplies the converted signal to the bus 38. The interface circuit 34 also supplies data in the personal computer function card 30 to the CNC.

Input/set screen data for inputting a part program, compensation data, and setting a parameter and the like, state display screen data for displaying states of a current position of each axis controlled by the CNC, alarm and the like, animated simulation data of solid drawings of a machine path and a workpiece, and image data necessary for interaction are converted to image signals and supplied to the LCD drive circuit 49 by the graphic control circuit 35.

The FD control circuit 36 and the HD control circuit 37 read necessary data or a program from the FDD 52 and the HDD 53 respectively to send to the RAM 33 or the like, and store the data and program desired to be retained into the FDD 52 and HDD 53, respectively.

Consequently, in accordance with the present invention, the detachable personal computer function card 30 is provided as a device for controlling the display functions of the MMC unit 15, so that the upgrading, changing and so on of the display functions based on the hardware are easily implemented only by replacing the personal computer function card 30 alone.

Further, the personal computer function card 30 can handle a signal from a peripheral device via the keyboard 152, the mouse 51, and even via the extended bus 39 because a processor is contained therein.

In addition, the MMC unit of the invention may be provided with plural sockets 155a to connect plural personal computer function cards 30, whereby relevant functions are more upgraded. The inventive MMC unit may be controlled so that the LCD unit 153 and the keyboard 152 are automatically connected to the CNC when the personal computer function card 30 is not connected, whereby the MMC unit of the present invention can be used as a conventional type MMC unit.

Though the above embodiment uses the LCD 153a as a display unit of the MMC unit 15, it is understood that a CRT and a plasma display may be used as well.

Then the second embodiment of the present invention will be described below.

This embodiment is an example when an MMC unit 15 with a personal computer function card 30 is combined with a robot control apparatus.

Figure 5:
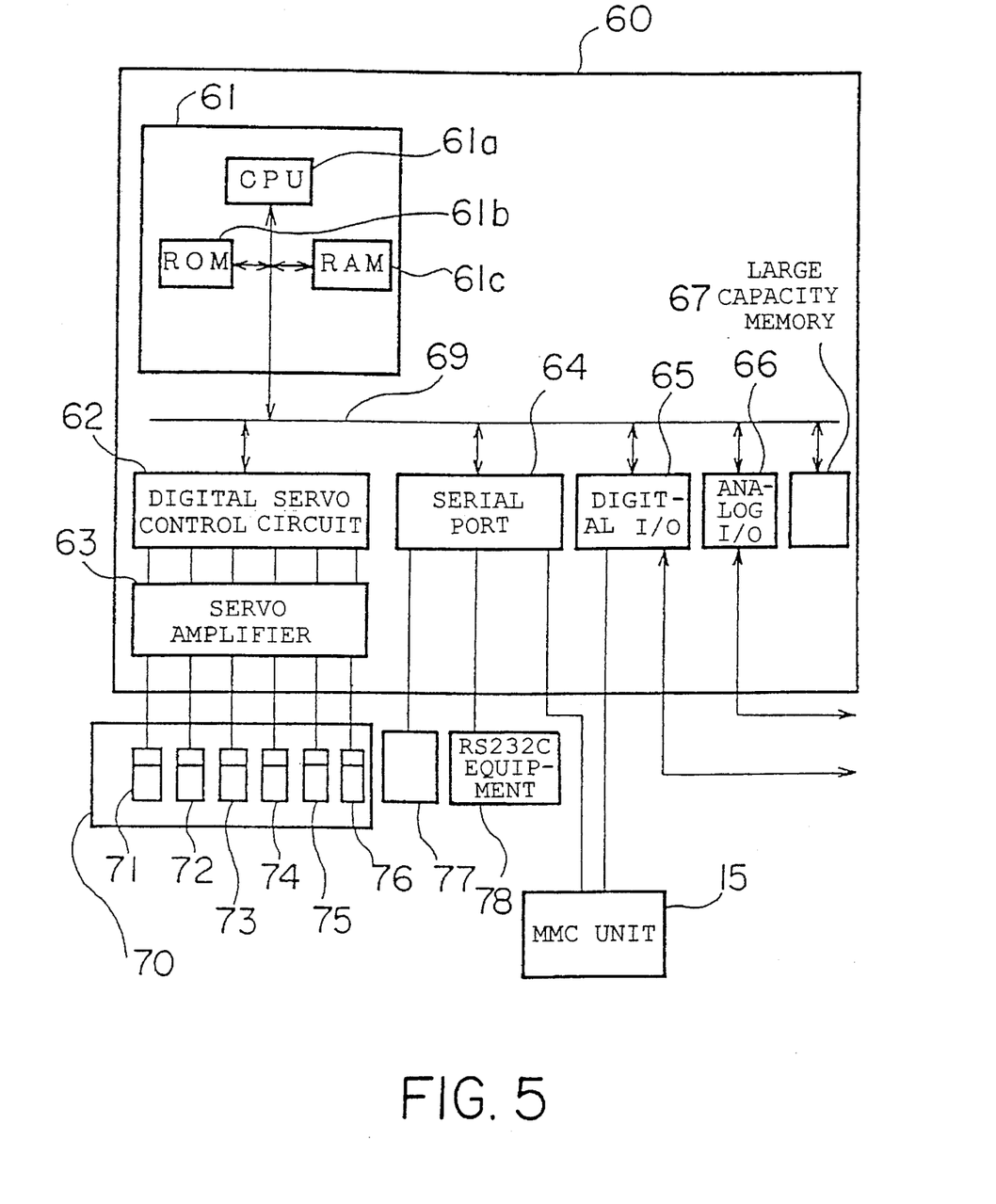
FIG. 5 is a block diagram schematically illustrating a configuration of a robot control apparatus.

FIG. 5 is a schematic configuration view of a robot control apparatus. The robot control apparatus 60 comprises a processor board to which a processor 61a, a ROM 61b, and a RAM 61c are mounted. The processor 61a controls the entire robot control apparatus 60 according to a system program stored in the ROM 61b. The RAM 61c contains various data including an operation program of a robot 70. The RAM 61c partly comprises a non-volatile memory to store data and a program desired to be retained after turning off the power. The processor board 61 is connected to a bus 69.

A digital servo control circuit 62 is connected to the bus 69 and drives servo motors 71, 72, 73, 74, 75, and 76 via a servo amplifier 63 in accordance with a command from the processor board 61. These servo motors are built into the robot 70 and drive respective axes of the robot 70.

A serial port 64 linked to the bus 69 is connected to an operator control panel 77 with the indicator, and the other RS232C equipment 78. The operator control panel 77 with the indicator is used for inputting data during teaching operations. The MMC unit 15 is connected to the serial port 64 and a digital I/O 65. The serial port 64 feeds a display command signal to the MMC unit 15, and the digital I/O 65 receives key input data from the MMC unit 15. The configuration of the MMC 15 is not described below because it is almost the same as those illustrated in FIG. 1, FIG. 3, and FIG. 4.

Also, via the digital I/O 65 and an analog I/O 66, for example, welding condition data and the like are supplied to a welding machine. Teaching data and the like are stored in a large capacity memory 67.

The MMC unit 15 connected to the robot control apparatus 60 mentioned above is allowed to display a input/set screen for setting and inputting a program, setting data and the like, a state display screen for displaying states of current positions of respective axes controlled by the robot control apparatus 60, an alarm, and the like, a teaching screen for teaching operations, and the like, on the display of the LCD 153a.

Then the third embodiment of the present invention is described below. This embodiment is an example when the MMC unit 15 with a personal computer function card 30 is combined with an injection molding machine.

Figure 6:
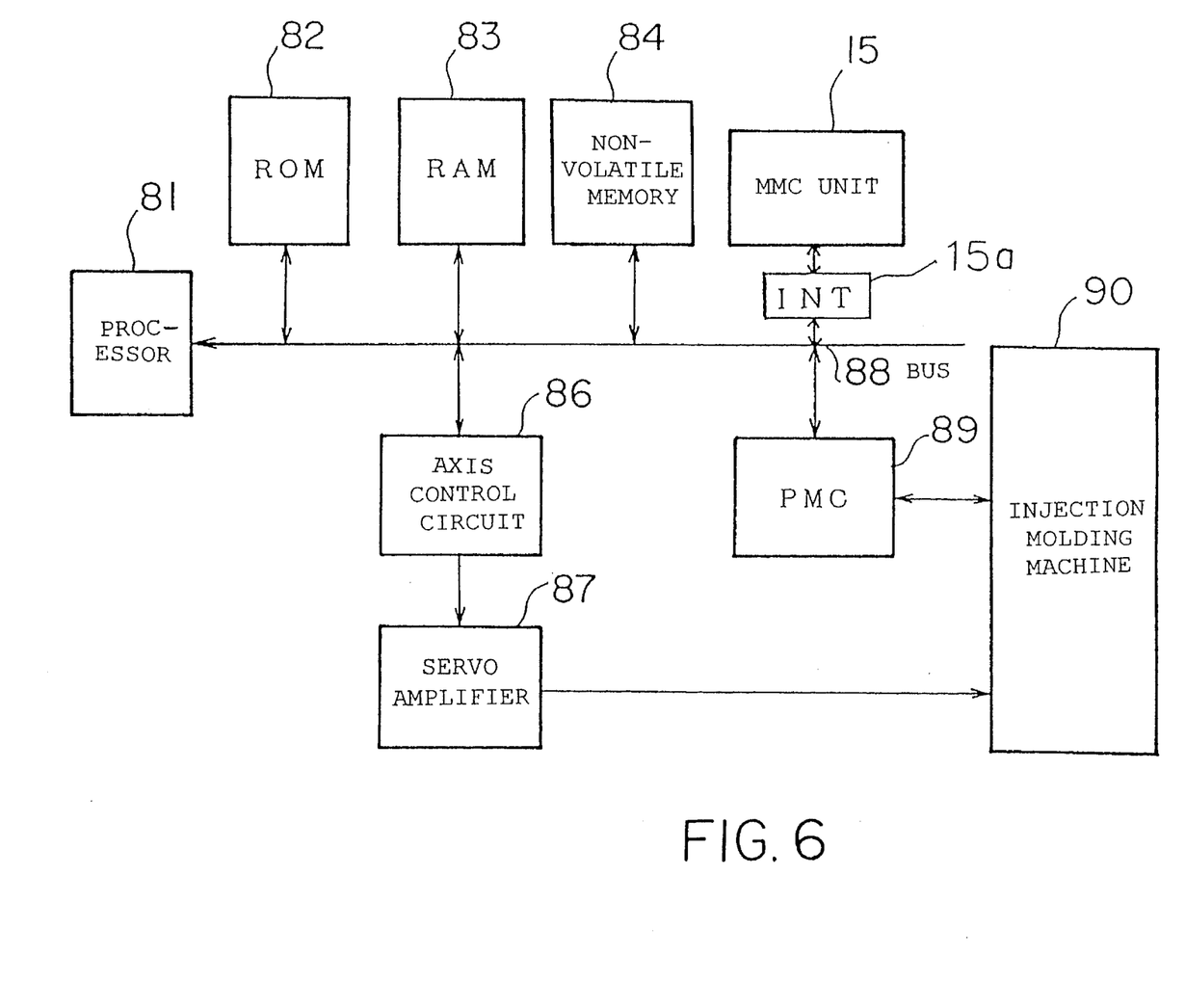
FIG. 6 is a block diagram schematically illustrating a configuration of an injection molding machine.

FIG. 6 is a schematic block diagram illustrating a configuration of an injection molding machine. A processor 81 controls the overall injection molding machine in accordance with a system program stored in a ROM 82 comprising an EPROM, an EEPROM, or the like. The RAM 83 comprises an SRAM or the like, in which various data and input/output signals are stored. A non-volatile memory 84 comprises a CMOS or the like which is backed up with a battery, wherein data, desired to be retained after turning off the power, is are stored.

The MMC unit 15 connected to a bus 88 via an interface (INT) 15a is the same unit shown in FIG. 1 which is equipped with the personal computer function card 30 and has almost the same configuration, therefore the descriptions of the configuration are not provided below. On a screen of the LCD 153a of the MMC unit 15, a set/input screen for setting and inputting data including position, speed, and pressure of a screw are displayed when the injection molding machine starts its injection molding operations. On the screen of the LCD 153a, molding condition data, graphically indicated molding state, and an alarm and its description are also displayed.

In response to a signal such as an M function signal or the like via the bus 88, a PMC 89 handles the received signal using a sequence program and yields an output signal to control the injection molding machine 90. In response to an input signal from the injection molding machine 90, the PMC 19 also performs the processing operations using the sequence program and transfers a necessary input signal to the processor 81 via the bus 88.

An axis control circuit 86 supplies a command on an axis to a servo amplifier 87 in response to an axis move command from the processor 81. In accordance with this move command, the servo amplifier 87 drives servo motors for operations including clamping, metering, and injection.

As mentioned above, in accordance with the present invention, the personal computer function card 30, which contains a processor, display control means for controlling screen displays on the display unit, and data transfer control means, is detachably connected to the MMC unit, whereby the upgrading, changing and so on of the display functions and operation functions are easily implemented by only replacing the personal function card 30 as required.

We claim:

1. A man machine controller unit which controls communication with a main control apparatus and a servoamplifier, comprising:

a display unit having a screen display;

data input means inputting data for controlling the servo-amplifier;

a function card comprising:
    a function card processor for processing the input data supplied from said data input means into processed data,
    display control means responsive to the function card processor for controlling the screen display of said display unit in accordance with display data and display command signals received from the main control apparatus through said bus, and
    data transfer means for transferring the input data supplied from said data input means and the processed data processed by said function card processor to said main control apparatus; and a socket to which said function card is detachably connected.

2. A man machine controller unit according to claim 1, wherein said main control apparatus is a computer numerical control apparatus.

3. A man machine controller unit according to claim 1, wherein said main control apparatus is a robot control apparatus.

4. A man machine controller unit according to claim 1, wherein said main control apparatus is an injection molding machine.

5. A man machine controller unit according to claim 1, wherein said function card processes data from peripheral equipment other than said display unit.

6. A man machine controller unit according to claim 1, wherein said display unit is a cathode ray tube (CRT).

7. A man machine controller unit according to claim 1, wherein said display unit is a liquid crystal display (LCD).

8. A man machine controller unit according to claim 1, wherein said display unit is a plasma display.

9. A man machine controller unit according to claim 1, wherein said function card and said main control apparatus are connected through a serial data line.

10. A man machine controller unit according to claim 1, further comprising a plurality of sockets for connecting to a corresponding plurality of function cards.

11. A man machine controller unit which controls communication with a main control apparatus and a machine comprising:

a display unit having a screen display;

data input means inputting data for controlling the machine;

a function card comprising:
    a function card processor for processing the input data supplied from said data input means into processed data,
    display control means responsive to the function card processor for controlling the screen display of said display unit in accordance with display data and display command signals received from the main control apparatus, and
    data transfer means for transferring the input data and the processed data to said main control apparatus; and a socket detachably connected to said function card.

12. The man machine controller unit according to claim 11 wherein the machine is a machine tool.

13. The man machine controller unit according to claim 11 wherein the machine is a robot.

14. The man machine controller unit according to claim 11 wherein the machine is a plastic mold injection machine.

15. An interactive computer numerical control apparatus comprising:

a machine tool;

a display unit having a screen display;

a main processor providing computer numeric control of the machine tool and providing display command signals in accordance with a system program;

a data bus connected to the main processor for transmitting data including the display command signals;

a memory connected to the data bus and storing the system program;

a man machine controller unit connected to the data bus, said man machine controller unit further comprising:

data input means for inputting machine tool data;

a detachable function card which executes a display program;

a drive circuit which generates a machining profile of the machine tool in response to the display program executed by the detachable function card; and display control means responsive to the machining profile received from the drive circuit and display command signals received from the main processor for controlling the screen display of said display unit;

wherein the man machine controller receives machine tool data from the data input means for controlling the machine tool and transfers the machine tool data to the main processor by way of the data bus; and a programmable machine controller connected to the data bus and controlling the machine tool in response to computer numeric control from the main processor.

16. An interactive robot control apparatus comprising:

a robot having control axes;

a display unit having a screen display;

a main processor which controls the robot in accordance with a system program;

a data bus connected to the main processor;

a memory connected to the data bus and storing the system program;

a man machine controller unit connected to the data bus, said man machine controller unit comprising:

data input means from inputting data;

a detachable function card which executes a display program; and means for controlling the display unit to display current positions of the robot control axes in response to the display program executed by the detachable function card;

wherein the man machine controller receives input data from the data input means for controlling the robot and transfers the input data to the main processor by way of the data bus; and a digital servo control circuit which executes program control of the robot in response to the main processor.

17. An interactive plastic mold injection machine control apparatus comprising:

a plastic mold injection machine having a screw;

a display unit having a screen display;

a main processor which controls the plastic mold injection machine in accordance with a system program;

a data bus connected to the main processor for transmitting data;

a memory connected to the data bus and storing the system program;

a man machine controller unit connected to the main processor by way of the data bus, said man machine controller comprising:

data input means for inputting data;

a detachable function card which executes a display program;

means for controlling the display unit to display position, speed and pressure of the plastic mold injection machine screw in response to the display program executed by the detachable function card;

wherein the man machine controller receives input data from the data input means for controlling the plastic mold injection machine and transfers the input data to the main processor by way of the data bus; and a programmable machine controller which executes program control of the plastic mold injection machine in response to the main processor.

\* \* \* \* \*